(12) United States Patent
Brian

(10) Patent No.: US 6,446,348 B1
(45) Date of Patent: Sep. 10, 2002

(54) WORK TAPER GAGING EQUIPMENT

(76) Inventor: Frank J. Brian, 3701 Ahern, Baldwin Park, CA (US) 91706

( * ) Notice: Subject to any disclaimer, the term of this patent is extended or adjusted under 35 U.S.C. 154(b) by 74 days.

(21) Appl. No.: 09/629,751

(22) Filed: Jul. 31, 2000

(51) Int. Cl.⁷ .................................................. G01B 3/22
(52) U.S. Cl. ............................................ 33/532; 33/833
(58) Field of Search ........................... 33/833, 832, 531, 33/532, 549, 555

(56) References Cited

U.S. PATENT DOCUMENTS

| | | | |
|---|---|---|---|
| 761,378 A | * 5/1904 | Hazelton ..................... | 33/532 |
| 1,469,343 A | 10/1923 | Strong | |
| 1,472,195 A | 10/1923 | Schlaupitz | |
| 1,664,535 A | 4/1928 | Bartholdy | |
| 1,769,077 A | 7/1930 | Small | |
| 2,460,854 A | * 2/1949 | Smith ........................... | 33/532 |
| 2,472,306 A | * 6/1949 | Minuto ......................... | 33/532 |
| 2,490,376 A | * 12/1949 | Rupley ......................... | 33/532 |
| 2,551,471 A | * 5/1951 | Snow ............................ | 33/532 |
| 2,642,670 A | 6/1953 | Dow | |
| 2,731,825 A | 1/1956 | Le Van | |
| 3,327,399 A | * 6/1967 | Gershman .................... | 33/532 |
| 4,219,936 A | * 9/1980 | Bridges ........................ | 33/174 |
| 4,905,378 A | * 3/1990 | Culver et al. ................. | 33/836 |
| 5,497,559 A | * 3/1996 | Okumura et al. ............. | 33/517 |

* cited by examiner

*Primary Examiner*—Diego Gutierrez
*Assistant Examiner*—Gail Verbitsky
(74) *Attorney, Agent, or Firm*—William W. Haefliger

(57) ABSTRACT

In a gage to gage an axially tapered surface on work, the combination comprising first and second gage sections defining an axis, and relatively movable axially; first locaters on the first section to engage the tapered surface at first locations spaced about the axis; second locaters on the second section to engage the tapered surface at second locations spaced about the axis, an indicator plunger on the second section to engage a shoulder on the first section as the two sections are relatively moved, axially; and whereby the amount of subsequent relative movement of the two sections prior to engagement of the second locaters with the work is an indication of work surface taper deviation from a predetermined taper.

12 Claims, 3 Drawing Sheets

WORK TAPER GAGING EQUIPMENT

BACKGROUND OF THE INVENTION

This invention relates generally to gaging apparatus, and more particularly to such apparatus capable of gaging a tapered annular surface on work, in order to quickly obtain an accurate indication of taper deviation from a predetermined taper.

There is need for improvements in gaging apparatus of the type referred to above. No prior apparatus of which I am aware provides the unusually advantageous features of construction, modes of operation and improved results, as will appear.

SUMMARY OF THE INVENTION

It is a major object of the invention to provide an improved gage as referred to, which comprises, in combination:

a) first and second gage sections defining an axis, and movable axially, b) first locaters on the first section to engage said tapered surface at first locations spaced about said axis, c) second locaters on the second section to engage said tapered surface at second locations spaced about said axis, d) and an indicator plunger on the second section to engage the first section as the two sections are relatively moved, axially, e) whereby the amount of subsequent relative movement of the two sections prior to engagement of second locaters with the work is an indication of work surface taper deviation from a predetermined taper.

As will appear, the first, and/or the second locaters preferably comprise surfaces having spherical extents to engage the taper; and such surfaces may comprise balls, or spherical surface extents, for accuracy of engagement with the taper.

Another object is to provide one or more first adjustable members carrying one or more of the first locaters to adjust the spacing of said one or more first locaters relative to the axis. In addition, one or more second adjustable members may be provided to carry one or more of the second locaters, to adjust the spacing of said one or more second locaters relative to said axis.

A further object is to provide the first adjustable members to have screw threaded connection with the first gage section. Similarly, the second adjustable members may have screw threaded connection with the second gage section. Accordingly, all of the members carrying the spherical surface locaters may be accurately pre-adjusted to engage surfaces of an auxiliary device, such as a master, and that correspond to the desired taper of the work, whereby work taper deviation from the desired taper may be rapidly and accurately determined.

DRAWING DESCRIPTION

DETAILED DESCRIPTION

Figure 1:
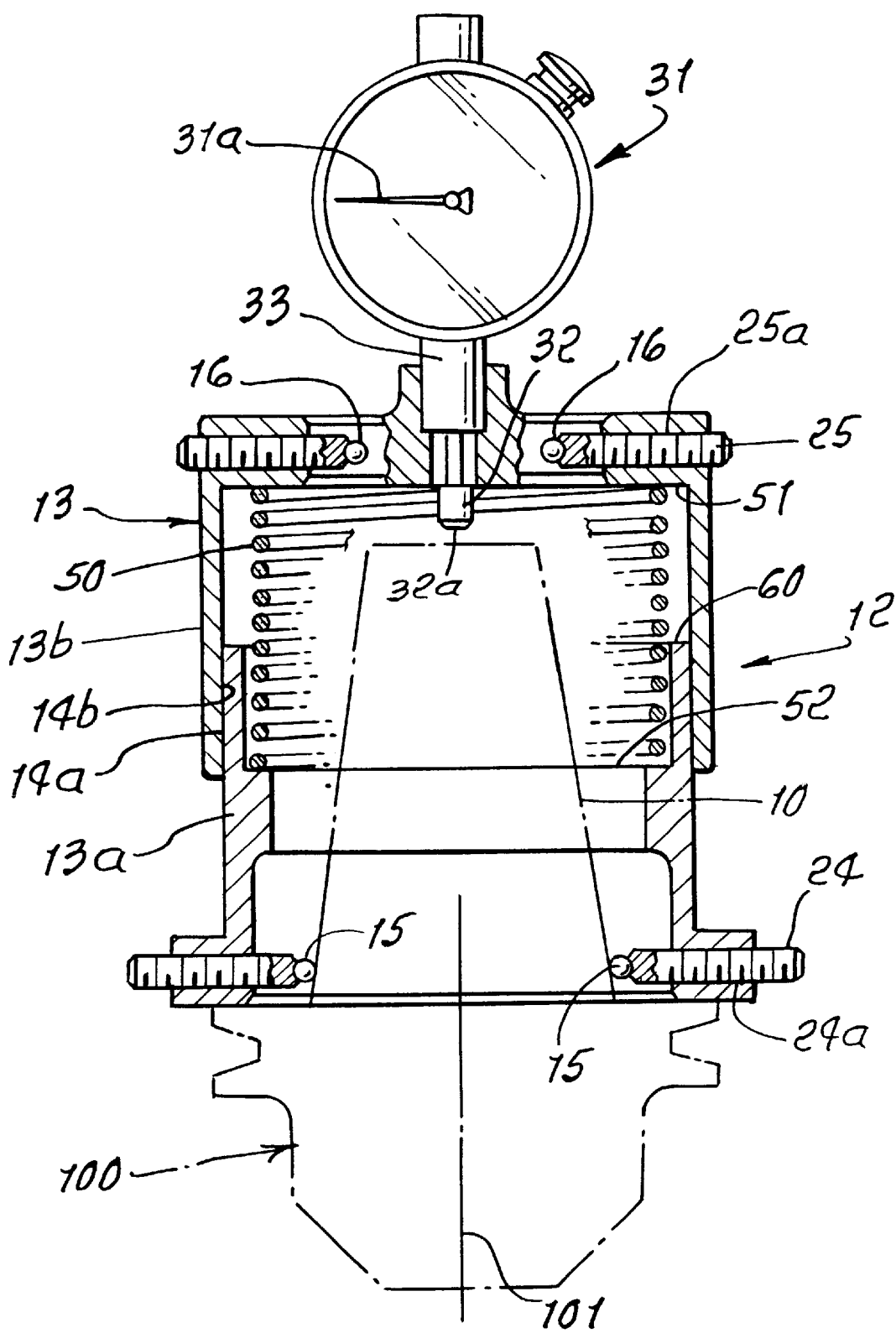
FIG. 1 is a first elevation, taken in section to show details of a preferred from of a gaging device incorporating the invention.
Figure 3:
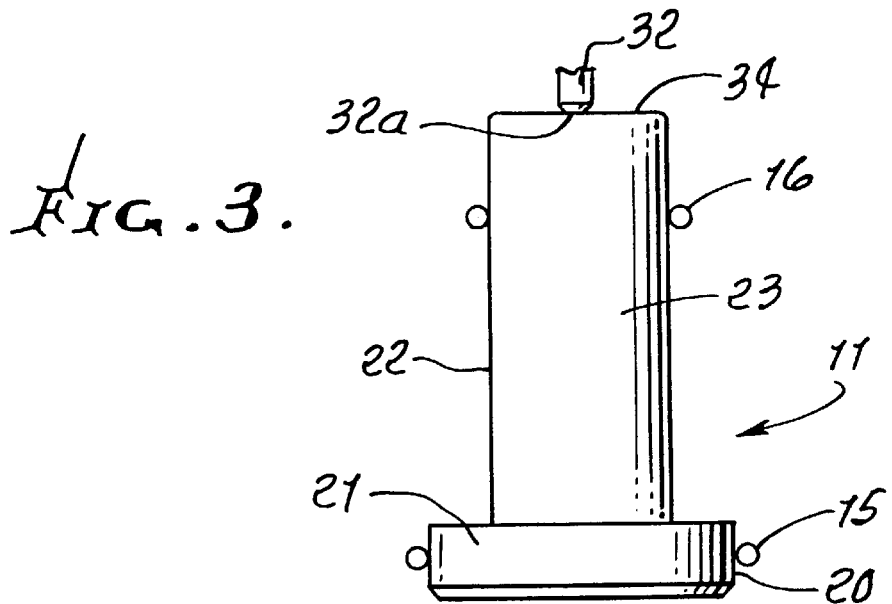
FIG. 3 shows a master gage setting or adjusting device.

Referring first to FIG. 1, a tool holder 100 has a tapered surface 10, shown in broken lines. The tool holder defines an axis of rotation 101. It becomes necessary, in practice, to gage the taper of surface 10, as for example in relation to a master in the form of a gage setting device 11, shown in FIG. 3, to detect any error in such tool holder taper.

The gaging device 12 has a body 13 that includes a lower cylindrical section 13a, and an upper cylindrical section 13b. The two sections interfit axially and telescopically, as for example is provided by sliding interfit of cylindrical outer surface 14a of section 13a with cylindrical bore 14b of section 13b. A compression spring 50 with opposite ends resting at shoulders 51 and 52, tends to yieldably resist lowering of the upper section 13b downwardly on the lower section 13a.

First locaters are provided on the first section 13a to engage the work tapered surface 10 at first locations spaced about axis 101; and second locaters are provided on the second section 13b to engage the tapered surface at second locaters spaced about said axis 101. In the example, the first locaters are provided by multiple spherical surfaces, such as on a set of balls 15 carried by lower section 13a; and the second locaters are provided by multiple spherical surfaces, such as on a set of balls 16 carried by the upper section 13b. Such surfaces or balls are typically made of hardened steel. The balls or tips of each set are spaced about axis 101, and their equal spacing from an axis such as axis 101 is first established as by the master device 11. Note in FIG. 3 the balls 15 positioned radially to engage the cylindrical setting surface 20 on a flange 21, and the balls 16 positioned radially to engage the cylindrical setting surface 22 of the post or shaft 23 on the device 11, and integral with flange 21. Surface 22 has lesser diameter than surface 21.

Such positioning of the balls is enabled by initial placement of the gaging device 10 axially onto the master 11, and by radial adjustment of the balls to engage setting surfaces 20 and 22. For this purpose, the balls may be carried by adjustable members such as screws. See for example, the first or lower radially adjustable members 24 carrying the balls 15 at their inner ends; and the second or upper radially adjustable members 25 carrying the balls 16 at their inner ends. Members 24 and 25 are shown as set screws having screw thread engagement with the sections 13a and 13b, at 24a and 25a whereby the screws are individually radially adjustable to cause the balls to engage the setting surfaces 20 and 21 of the master 11, as shown, when the upper section 13a is at correct spacing relative to the lower section, as indicated by the position of the rotary indicator 31a on dial gage 31.

The gage 31 has a plunger 32 operatively connected to indicator 31a, so that as the plunger is pushed up relative to the gage body 33 carried by section 13b, the indicator correspondingly rotates. The lower end surface 32a of the plunger engages a surface 34 of the master, and is pushed relatively upwardly as the upper section 13b is pushed downwardly. A spring within gage body 33 urges the plunger downwardly.

Figure 2:
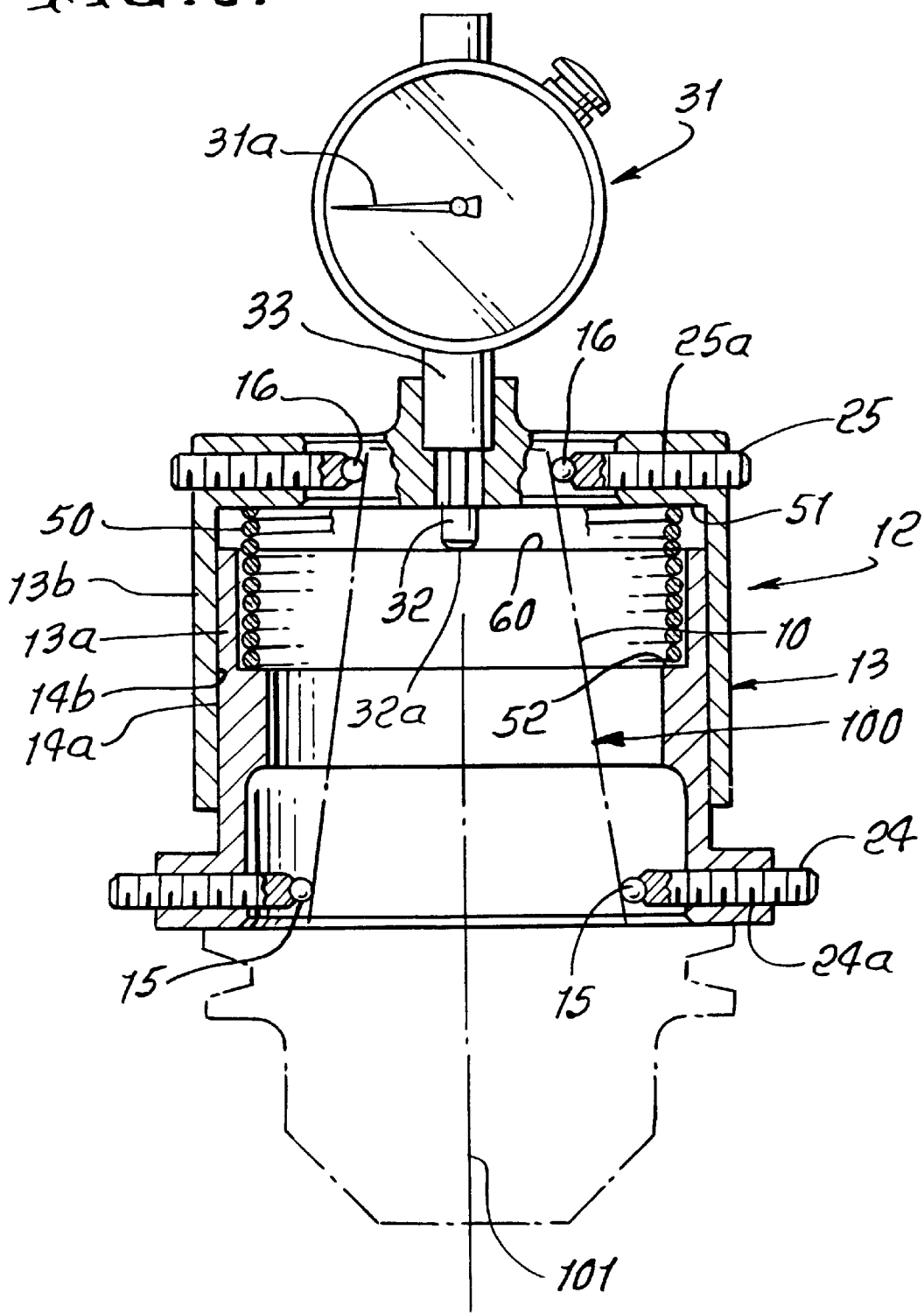
FIG. 2 is a view like FIG. 1, but showing gaging ball surfaces engaging a tapered workpiece.

Assuming that the lower set of balls 15 is engaging the tapered surface 10, as shown in FIG. 1, the lower section 13a is effectively seated on the taper. The upper section 13b is then displaced downwardly, so that the lower end 32a of the plunger engages a ledge 60 on the lower section 13a. Upper section 13b is then lowered further, say an amount Δ, until the upper balls 16 seat radially on the tapered surface 10, as shown in FIG. 2. During lowering by amount Δ, the gage body 33 moves downwardly with section 13b, on which it is mounted, and relative to the plunger, seated at 60, whereby the gage gives a reading corresponding to amount $\Delta$. If the work taper is "off", i.e. out of true, $\Delta$ will vary from the true amount $\Delta_T$, determined by the master at initial setting of the device. Accordingly, the indicator on the gage will have one position corresponding to $\Delta$ and another position corresponding to $\Delta_T$, and can be calibrated so that the difference $\Delta_T$-$\Delta$ corresponds to the amount of out-of-true taper of the work. In other words relative movement of the two sections prior to engagement of second locaters with the work is an indication of work surface taper deviation from a predetermined taper. Out of true of the surface 10 at different degrees of azimuth about axis 101 can also be determined, by rotation of section 13b relative to section 13a, and observing movement of the indicator 31a.

Figure 4:
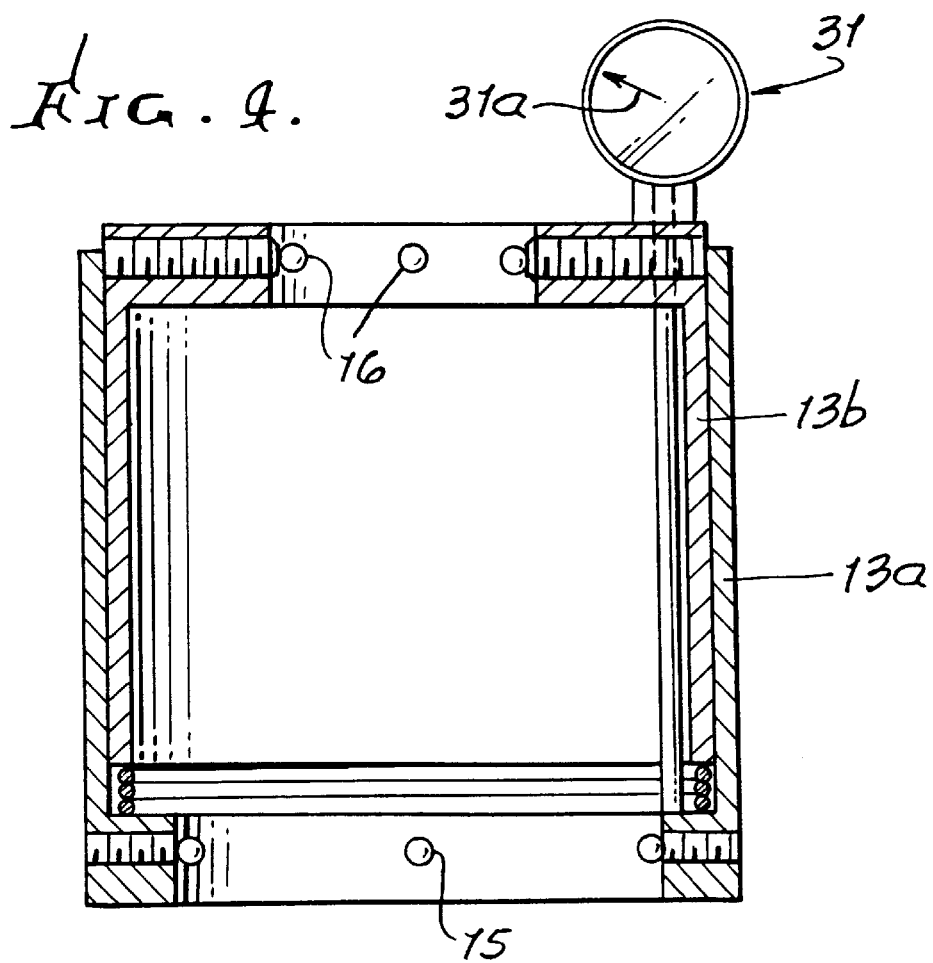
FIG. 4 is a schematic view showing elements of the FIGS. 1 and 2 device, in side elevation.

In FIG. 4, the section 13a defines a skirt that is located radially outwardly of a skirt defined by section 13b.

I claim:

1. A combination of a gage to gage an axially tapered surface on work, and including said work, the combination with said work comprising
   a) first and second gage sections defining an axis, and movable relatively telescopically and axially,
   b) first locaters on the first section to engage said tapered surface at first locations spaced about said axis,
   c) second locaters on the second section to engage said tapered surface at second locations spaced about said axis,
   d) an indicator plunger on the second section to engage a shoulder on the first section as the two sections are relatively moved axially,
   e) whereby the amount of subsequent relative movement of the two sections prior to engagement of the second locaters with the work is an indication of work surface taper deviation from a predetermined taper,
   f) there being first radially adjustable members carrying the locaters on at least one section, said members being individually adjustable radially, and having radially outwardly exposed adjustable ends,
   g) said locaters on said at least one section having spherical surfaces to engage the work tapered surface.

2. The combination of claim 1 wherein said first locaters comprise balls.

3. The combination of claim 1 wherein said second locaters comprise balls.

4. The combination of claim 1 wherein said first adjustable members carry one or more of the first locaters to adjust the spacing of said one or more first locaters relative to said axis.

5. The combination of claim 1 including one or more second adjustable members carrying one or more of the second locaters to adjust the spacing of said one or more second locaters relative to said axis.

6. The combination of claim 4 wherein said first locaters comprise three circularly spaced balls at at least one axial location, the two sections having telescopic slide fit.

7. The combination of claim 1 wherein said first and second locaters comprise balls.

8. The combination of claim 4 wherein said first members have screw thread connection with the first section.

9. The combination of claim 5 wherein the second members have screw threaded connection with the second section.

10. The combination of claim 1 wherein the first section shoulder faces the end of said plunger.

11. The combination of claim 10 wherein the sections are cylindrical, and including a compression spring within a space surrounded by said sections and acting to urge the sections in a direction to carry the plunger out of engagement with said shoulder.

12. The combination of claim 1 wherein the second section is rotatable about said axis relative to the first section, said sections having telescopic interfit.

* * * * *